US011656517B2

(12) United States Patent
Na

(10) Patent No.: US 11,656,517 B2
(45) Date of Patent: May 23, 2023

(54) DISPLAY DEVICE

(71) Applicant: SAMSUNG ELECTRONICS CO., LTD., Suwon-si (KR)

(72) Inventor: Jeongshan Na, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 37 days.

(21) Appl. No.: 17/285,554

(22) PCT Filed: Jun. 12, 2019

(86) PCT No.: PCT/KR2019/007050
§ 371 (c)(1),
(2) Date: Apr. 15, 2021

(87) PCT Pub. No.: WO2020/085604
PCT Pub. Date: Apr. 30, 2020

(65) Prior Publication Data
US 2021/0405409 A1 Dec. 30, 2021

(30) Foreign Application Priority Data
Oct. 24, 2018 (KR) ........................ 10-2018-0127780

(51) Int. Cl.
G02F 1/1368 (2006.01)
G02F 1/1362 (2006.01)

(52) U.S. Cl.
CPC ...... *G02F 1/1368* (2013.01); *G02F 1/136209* (2013.01); *G02F 1/136222* (2021.01)

(58) Field of Classification Search
CPC ............. G02F 1/1368; G02F 1/136222; G02F 1/136209; G02F 1/133524;
(Continued)

(56) References Cited

U.S. PATENT DOCUMENTS 5,508,834 A * 4/1996 Yamada ............ G02F 1/133528
349/58
2002/0008916 A1 * 1/2002 Nishikawa ........... G02B 3/0018
359/619
(Continued)

FOREIGN PATENT DOCUMENTS

JP       09138393 A      5/1997
JP     2005128517 A      5/2005
(Continued)

OTHER PUBLICATIONS

International Search Report (PCT/ISA/210) dated Sep. 19, 2019 issued by the International Searching Authority in International Application No. PCT/KR2019/007050.
(Continued)

*Primary Examiner* — Hoan C Nguyen
(74) *Attorney, Agent, or Firm* — Sughrue Mion, PLLC

(57) ABSTRACT

A display device according to the present disclosure comprises: a display panel; and a backlight for supplying light to the display panel, wherein the display panel includes: a base substrate having a plurality of thin film transistors; a color filter layer which includes a plurality of color filters arranged in a matrix shape and black matrices disposed between the plurality of the color filters, and is disposed on the base substrate; and a light-collecting layer disposed above or below the color filter layer and including a plurality of partition walls extending toward the black matrices.

9 Claims, 9 Drawing Sheets

(58) Field of Classification Search
CPC ......... G02F 1/133514; G02F 1/133526; G02F
1/1362; G02F 1/133512; G02F 1/1336;
G02F 1/133516; G02F 1/133562; G02F
1/1335; G02F 1/133555; G02F 2203/09;
H01L 27/14627; H01L 27/14621; H01L
27/14685; H01L 27/1464; H01L 27/3211;
H01L 27/3246; H01L 27/3283; H01L
51/5275; H01L 51/525; G02B 5/201;
G02B 30/27; G02B 1/041; G02B 3/0006;
G02B 13/18; G02B 7/02; G02B 30/30;
G02B 3/0037; G02B 27/0955; G02B
27/0961; G02B 2006/12102; F21V 5/04;
H05B 33/04; H05B 33/22
See application file for complete search history.

(56) References Cited

U.S. PATENT DOCUMENTS

| | | | |
|---|---|---|---|
| 2005/0122465 A1 | 6/2005 | Togashi | |
| 2007/0096243 A1* | 5/2007 | Masuda | H01L 27/14687 257/462 |
| 2012/0217521 A1* | 8/2012 | Ohta | H01L 51/5275 257/89 |
| 2012/0218173 A1 | 8/2012 | Ohta et al. | |
| 2014/0111855 A1* | 4/2014 | Johnson | A61L 15/18 359/463 |
| 2014/0339509 A1 | 11/2014 | Choi et al. | |
| 2014/0339606 A1* | 11/2014 | Lin | H01L 27/14621 438/70 |
| 2018/0101054 A1 | 4/2018 | Zha | |
| 2018/0188606 A1 | 7/2018 | Lee et al. | |
| 2019/0198536 A1* | 6/2019 | Wang | H01L 27/1464 |

FOREIGN PATENT DOCUMENTS

| | | | |
|---|---|---|---|
| JP | 2010066437 A | 3/2010 | |
| JP | 2011069858 A | 4/2011 | |
| JP | 2011252990 A | 12/2011 | |
| JP | 2013235141 A | 11/2013 | |
| KR | 10-1999-0058457 A | 7/1999 | |
| KR | 1020140135568 A | 11/2014 | |
| KR | 101615397 B1 | 4/2016 | |
| WO | WO-2021149349 A1 * | 7/2021 | ............ H04N 5/369 |

OTHER PUBLICATIONS

Written Opinion (PCT/ISA/237) dated Sep. 19, 2019 issued by the International Searching Authority in International Application No. PCT/KR2019/007050.

* cited by examiner

DISPLAY DEVICE

TECHNICAL FIELD

The disclosure relates to a display device, and more particularly to a display device which improved light properties.

BACKGROUND ART

The display device uses a light-emitting element to display an image. The display device may be classified as a liquid crystal display (LCD), an organic light emitting diode display (OLED display), a plasma display panel (PDP), a electrophoretic display, and the like according to the light-emitting method.

The liquid crystal display (LCD), which is currently one of the most widely used display devices, is comprised of two substrates on which electrodes are formed and a liquid crystal layer inserted therebetween. The liquid crystal display is a display device which adjusts an amount of light being transmitted by realigning liquid crystal molecules of a liquid crystal layer by applying a voltage to two electrodes.

The liquid crystal display may have a disadvantage of having a narrow viewing angle. The viewing angle may be a viewing angle which limits a contrast ratio that is changed according to the angle (output angle of light) viewed. There may be the problem of a color and a contrast ratio changing according to a direction in which a user views the display device.

DISCLOSURE

Technical Problem

Aspects of the disclosure are to address at least the above-mentioned problems and/or disadvantages and to provide at least the advantages described below. Accordingly, an aspect of the disclosure is to provide a display device capable of improving a viewing angle and visibility.

Technical Solution

According to an aspect of the disclosure, a display device comprises a display panel; and a backlight configured to provide light to the display panel; and the display panel comprises a base substrate on which a plurality of thin film transistors are formed; a color filter layer disposed on the base substrate, the color filter layer comprising a plurality of color filters disposed in a matrix form and black matrices disposed in-between the plurality of color filters, and a light collecting layer configured to be disposed at an upper part or a lower part of the color filter layer, and comprising a plurality of partition walls formed to extend toward the black matrices.

A vertical space in the light collecting layer which is distinguished by the plurality of partition walls may correspond to the plurality of color filters.

The light collecting layer may further include a lens disposed in-between the plurality of partition walls.

The lens may be disposed at an upper end or a lower end of the light collecting layer.

The lens may be alternately disposed at an upper end and a lower end of the light collecting layer.

The lens disposed at the upper end of the light collecting layer may be a concave lens, and the lens disposed at the lower end of the light collecting layer may be a convex lens.

The lens may be disposed at a center of the light collecting layer.

The plurality of partition walls may be configured to be formed at an incline on the color filter layer.

The plurality of partition walls may include a first partition wall extending to a first direction, and a second partition wall extending to a second direction which intersect with the first direction, and the first partition wall and the second partition wall may be provided to be spaced apart from each other.

The first partition wall and the second partition wall may be alternately disposed.

The plurality of partition walls may be spaced apart at a distance corresponding to each of the plurality of color filters.

The plurality of partition walls may be formed perpendicular to the color filter layer The plurality of partition walls may have a thickness corresponding to the black matrices.

The plurality of partition walls may be comprised of a black light shielding layer.

The plurality of partition walls may include a coating layer.

A liquid crystal layer disposed in-between the base substrate and the color filter layer may be further included.

DETAILED DESCRIPTION OF EXEMPLARY EMBODIMENTS

Figure 1:
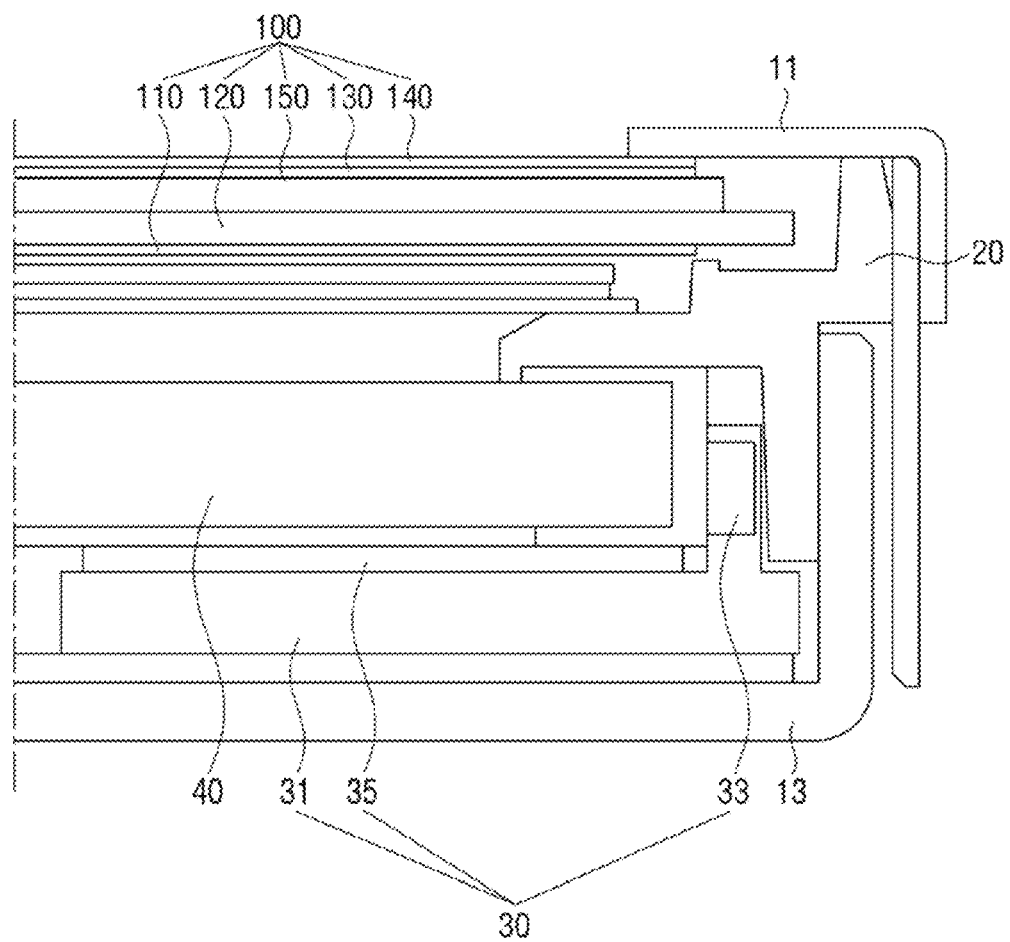
FIG. 1 is a schematic cross-sectional view illustrating a display device according to an embodiment of the disclosure.

Embodiments of an LED element and a method of manufacturing an LED element of the disclosure will be described in detail below with reference to the accompanying drawings.

The embodiment described herein are merely exemplary to aid in the understanding of the disclosure, and it is to be understood that the disclosure may be variously modified and realized different from the embodiments described herein. However, in case it is determined that in describing embodiments, detailed description of related known technologies may unnecessarily confuse the gist of the disclosure, the detailed description and detailed illustration will be omitted. In addition, the accompanied drawings are not illustrated to its actual scale but dimensions of some elements may be exaggeratedly illustrated to aid in the understanding of the disclosure.

Terms such as "first," and "second" may be used in describing the various elements, but the elements are not to be limited by the terms. The terms may be used only to distinguish one element from another. For example, a first element may be designated as a second element without exceeding the scope of protection of the disclosure, and likewise a second element may also be designated as a first element.

The terms used in the embodiments of the disclosure may be interpreted to meanings which are widely known to those of ordinary skill in the related art, unless specifically defined otherwise.

Terms such as 'top,' bottom,"tip end," rear end,'upper part,' 'lower part,' 'upper end,' 'lower end,' or the like used in the disclosure have been defined based on the drawing, and the shapes and locations of each element are not limited by these terms.

The disclosure will be described in detail below with reference to the accompanying drawings.

FIG. 1 is a schematic cross-sectional view illustrating a display device according to an embodiment of the disclosure.

Referring to FIG. 1, the display device 10 according to an embodiment of the disclosure may include a display panel 100 displaying light into an image, and a backlight 30 which includes a slight source 33 that provides light to the display panel 100.

Specifically, the display device 10 may include a display panel 100, a backlight 30 which is disposed spaced apart at a lower part of the display panel 100, a mold member 20 which supports the display panel 100 and the backlight 30 to be spaced apart from each other, and a top chassis 11 and a bottom chassis 13 which are disposed at each of an upper part and a lower part of the display panel 100 and the backlight 30.

The display panel 100 may be disposed at a top side of the backlight 30 so as to face the backlight 30 which will be described below. The display panel 100 may be disposed at a base substrate 110, a color filter layer 610 which faces the base substrate 110, a liquid crystal layer 120 disposed between the base substrate 110 and the color filter layer 610, and at a top part or a lower part of the color filter layer 130, and may include a light collecting layer 150 which converges light.

The base substrate 110 may be a substate of which a thin film transistor which is a switching element is formed in matrix form. In a source terminal and a gate terminal of the thin film transistors, a data line and a gate line may be connected respectively, and in a drain terminal, a pixel electrode comprised of a transparent conductive material may be connected.

The color filter layer 610 may be disposed facing the base substrate 110, and may be a substrate in which red, green and blue (RGB) pixels for realizing color are formed in a thin film form.

The color filter layer 610 may be formed with a common electrode comprised of a transparent conductive material so as to face the pixel electrode formed at the base substrate 110.

The display panel 100 may further include a light collecting layer 150 disposed at an upper part or a lower part of the color filter layer 130. The light collecting layer 150 may diffuse making a brightness of light output from the display panel 100 uniform or converge a high-brightness light to improve light characteristics of the display device 10. The specific structure of the light collecting layer 150 will be described below.

The display panel 100 may be formed with an electric field between the pixel electrode and the common electrode when power is applied to the gate terminal of the thin film transistor, the liquid crystal arrangement of the liquid crystal layer 120 interposed between the base substrate 110 and the color filter layer 130 by the electric field may be changed, and light transmittance may be changed according to change in arrangement of the liquid crystals and may display an image of a desired grayscale.

The display panel 100 may form an image by adjusting the liquid crystal arrangement of the liquid crystal layer 120, but because it is not able to emit light on its own, the image may be displayed by receiving light from the backlight 30 located at a back surface of the display panel 100.

The display panel 100 has been described as a liquid crystal display (LCD) which includes the liquid crystal layer 120, but is not limited thereto, and the display panel 100 may be comprise of a self-light emitting display panel such as an organic light-emitting diode (OLED).

The backlight 30 may be to provide light to the display panel 100, and may include light sources. In an example, the light source may be comprised of light emitting diodes (LED). The backlight 30 may be comprised of a side light type or a direct type which are distinguished according to the location of the light source which emits light.

As illustrated in FIG. 1, based on the backlight 30 being a side light type, the light of the light source arranged at a side surface with respect to the display panel 100 may be refracted to the light guide panel (LGP) and provided to the liquid crystal panel. Meanwhile, the side light type backlight 30 may further include an optical sheet. The light output from the light source may be guided so as to be surface emitted through a total reflection and a diffused reflection within the light guide panel after being incident to the light guide panel, and the light surface emitted from the light guide panel may be incident to the display panel 100 after being diffused and converged by the optical sheet disposed at an upper side of the light guide panel.

The side light type backlight 30 may include an LED driving printed circuit board 31, multiple LEDs 33 mounted in the LED driving printed circuit board 31 and a light source emitting light, and an optical sheet 35.

The LED driving printed circuit board 31 may be attached and fixed to an inside surface of the bottom chassis 13. The multiple LEDs 33 may be arranged along one side surface of the LED driving printed circuit board 31. The multiple LEDs 33 may be arranged along each edge of the light guide panel 40 interspaced at a predetermined distance.

In FIG. 1, the backlight 30 has been illustrated as a side light type, but is not limited thereto, and the backlight may be comprised of a direct type. If the backlight 30 is a direct type, multiple light sources may be arranged at a rear surface of the liquid crystal panel and may supply light.

The direct type backlight may be similar with the side light type backlight 30, and may be different with respect to the multiple LEDs 33 being mounted to one surface of the LED driving printed circuit board 31. In addition, the direct type backlight may be different from the side light type backlight in terms of not including the light guide panel.

The mold member 20 may support some components of the display device 10 in addition to the top chassis 11 and the bottom chassis 13. To this end, the mold member 20 may be disposed at an edge area inside the display device 10 and disposed in-between the top chassis 11 and the bottom chassis 13.

The light generated from the light source 33 of the backlight 30 may be orientated to the display panel 100. However, because the light generated from the light source 33 has no predetermined directionality, light efficiency may decrease as light is irradiated also to the surroundings in addition to each of the color filters of the color filter layer 130. The display panel 100 of the display device 10 according to an embodiment of the disclosure may further include the light collecting layer 150 for raising light converging efficiency.

Figure 2:
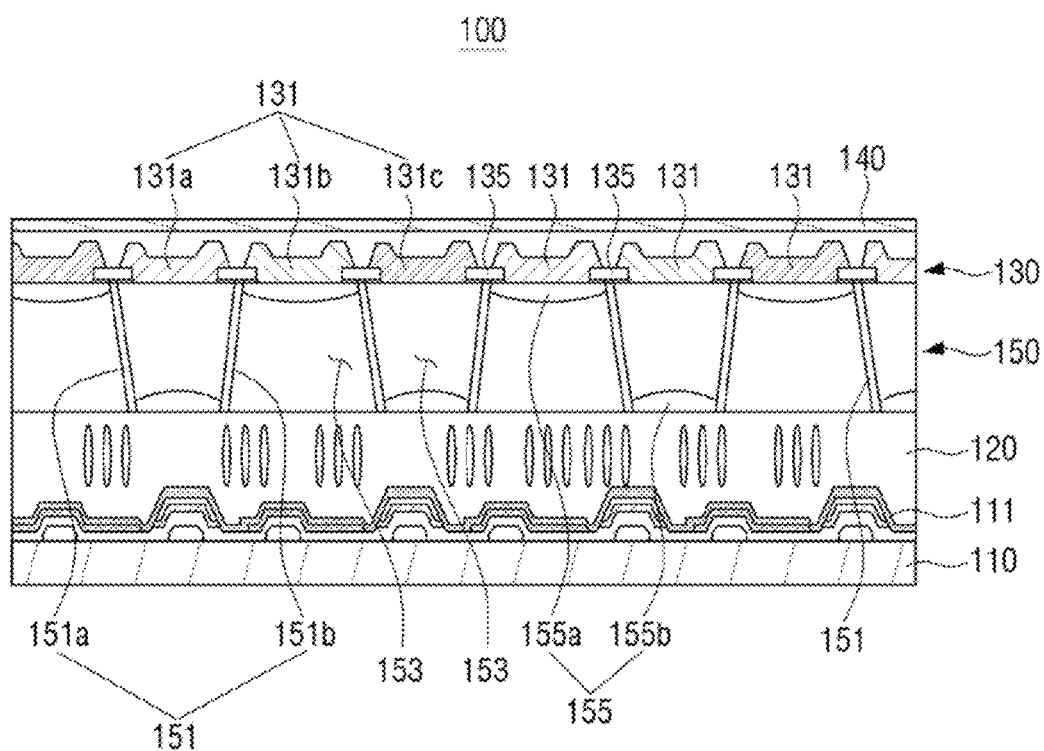
FIG. 2 is a cross-sectional view illustrating a display panel according to an embodiment of the disclosure.

FIG. 2 is a cross-sectional view illustrating a display panel according to an embodiment of the disclosure.

Referring to FIG. 2, the display panel 100 may include a base substrate 110, a color filter layer 610 facing the base substrate 110, a liquid crystal layer 120 disposed between the base substrate 110 and the color filter layer 610, and a light collecting layer 150 disposed at a lower part of the color filter layer 130. Based on the thin film transistor being turned-on by applying power to the gate terminal of the thin film transistor of the base substrate 110, an electric field may be formed in between the pixel electrode and the common electrode. The liquid crystal arrangement of the liquid crystal layer 120 may be changed by this electric field, and an image of a desired grayscale may be displayed by the light transmittance being changed according to the change in arrangement of the liquid crystals.

The base substrate 110 may be a substrate in which the thin film transistor 111 which is a switching element is formed in a matrix form. The liquid crystal layer 120 may be disposed on the base substrate 110.

The color filter layer 130 may be disposed on the liquid crystal layer 120. The color filter layer 610 may include a plurality of color filters 131 disposed in matrix form and black matrices disposed in-between the plurality of color filters 131.

The plurality of color filters 131 may include a first filter 131a in which a red color is realized, a second filter 131b in which a green color is realized, and a third filter 131c in which a blue color is realized as light passes therethrough. The first filter 131a, the second filter 131b, and the third filter 131c may be spaced apart at a determined distance and disposed in a matrix form.

The black matrices 135 may be disposed on-between the first filter 131a, the second filter 131b and the third filter 131c, and may define a boundary between the first filter 131a, the second filter 131b, and the third filter 131c.

The black matrices 135 may distinguish therebetween the first filter 131a, the second filter 131b, and the third filter 131c, and may be disposed adjacent to the first filter 131a, the second filter 131b, and the third filter 131c. The black matrices 135 may be comprised of a light shielding material. The black matrices 135 may have a shape corresponding to a surrounding area. The black matrices 135 may prevent light leakage phenomenon to the color filter 131 in which light is displayed, and clearly distinguishes the boundary between the adjacent color filters 131.

The color filter layer 231 may use the black matrices 221 as the boundary, and the first filter 131a, the second filter 131b, and the third filter 131c may be repeatedly disposed. The color filter layer 130 may add color to light which is irradiated from the backlight 30 and have passed the liquid crystal layer 300.

The light emitted from the liquid crystal layer 120 may be emitted to various directions. Accordingly, the light supplied to the color filter layer 130 may be emitted toward not only the first filter 131a, the second filter 131b, and the third filter 131c, but also to the black matrices 135.

The display panel 100 according to an embodiment of the disclosure may include the light collecting layer 150 to provide light provided from the backlight 30 to only the color filter 131.

The light collecting layer 150 may be disposed at the lower part of the color filter layer 130. The light collecting layer 150 may be for converging light provided from the backlight 30 to the upper part direction and outputting the light.

The light collecting layer 150 may include a plurality of partition walls 151 which extends toward the black matrices 135 formed in-between the neighboring color filters 131 of the plurality of color filters 131. The partition wall 151 may be formed so as to surround one color filter 131 in its entirety or surround a part thereof when viewed on a plane.

The partition wall 151 may gather light provided to the light collecting layer 150 and provide light only to an area corresponding to one color filter 131 of the plurality of color filters 131. The color purity realized in the each of the color filters 131 by the partition wall 151 may be improved.

The plurality of partition walls 151 may be in contact with the lower surface of the black matrices 135 of the color filter layer 130. The partition wall 151 may be formed to have a predetermined thickness, and the thickness of the partition wall 151 may be formed to a thickness corresponding to the black matrices 135.

The partition wall 151 may be comprised of a light shielding material. Specifically, the partition wall 151 may be comprised of a black light shielding layer. The partition wall 151 may have a form corresponding to the black matrices 135. The partition wall 151 may prevent the light provided to the one color filter 131 from being provided to another color filter.

The plurality of partition walls 151 may be formed at an incline with respect to the color filter layer 130 to gather light incident to the light collecting layer 150 and provide to the color filter layer 130. The light incident to the light collecting layer 150 may be guided so as to proceed to only the color filter 131 by the partition wall 151.

Further, in FIG. 2, although the plurality of partition walls 151 has been illustrated as being arranged in an incline on the color filter layer 130, but is not limited thereto, and the plurality of partition walls 151 may be arranged perpendicular to the color filter layer 130.

A vertical space 153 through which light passes in-between the first partition wall 151a and the second partition wall 151b which are adjacent to each other of the plurality of partition walls 151 may be defined. Each vertical space 153 may be formed by the upper surface of the first partition wall 151a, the second partition wall 151b, and the liquid crystal layer 120, and the lower surface of the color filter layer 130.

The first partition wall 151a may be extendingly formed in a first direction, and the second partition wall 151b may be extendingly formed in a second direction which intersects with the first direction. The first partition wall 151a and the second partition wall 151b may be disposed spaced apart from each other. The space between the first partition wall 151a and the second partition wall 151b may be arranged spaced part so as to have a distance corresponding to the one color filter 131.

The first partition wall 151a and the second partition wall 151b may be alternately disposed.

The vertical space 153 may be formed so as to correspond to the lower surface of each of the plurality of color filters 131. The vertical space 153 may be formed so that light may pass therethrough.

Because the vertical space 153 is configured such that the side surface is surrounded by the partition wall 151, light which passes the vertical space 153 may be provided to each of the plurality of color filters 131.

In-between the partition walls 151 which are adjacent with each other of the light collecting layer 150, that is, the vertical space 153, a lens 155 may be disposed. The lens 155 may be disposed at a location through which light incident to the vertical space 153 may pass therethrough. The lens 155 may be disposed at the upper end, a lower end, and a center of the vertical space 153.

The lens 155 may be comprised of a first lens 155 *a* disposed at the upper end of the light collecting layer 150 and a second lens 155 *b* disposed at the lower end of the light collecting layer 150. The first lens 155 *a* and the second lens 155 *b* may be alternately disposed.

In this case, the first lens 155 *a* disposed at the upper end of the light collecting layer 150 may be a concave lens having at least one or more curvature, and the second lens 155 *b* disposed at the lower end of the light collecting layer 150 may be a convex lens having at least one or more curvature.

The first lens 155 *a* and the second lens 155 *b* may be disposed to correspond to the color filter of the color filter layer 130. That is, a center of the first lens 155 *a* and the second lens 155 *b* may be disposed on an axis which is substantially the same as the center of the vertical space 153.

The light vertically incident to the vertical space 153 to which the first lens 155 *a* is disposed may be converged toward the color filter 131 by the partition wall 151, and the converged light may be converged by the first lens 155 *a* and converted again to vertical light and provided to the color filter 131.

In addition, the light vertically incident to the vertical space 153 to which the second lens 155 *b* is disposed the light vertically incident to the light collecting layer 150 may be converged toward the color filter 131 by the second lens 155*b*, and the converged light may be converged by the partition wall 151 and provided to the color filter 131.

The lens 155 may gather light passing through the light collecting layer 150 and provide to each of the color filters 131. The light incident to the light collecting layer 150 may be primarily converged by the partition wall 151, and secondarily converged by the lens 155.

The light collecting layer 150 may diffuse making a brightness of light output from the display panel 100 uniform or converge the high-brightness light to improve light characteristics of the display device 10.

The process of light output from the display panel 100 by the light collecting layer 150 being converged will be described in detail below.

Figure 3:
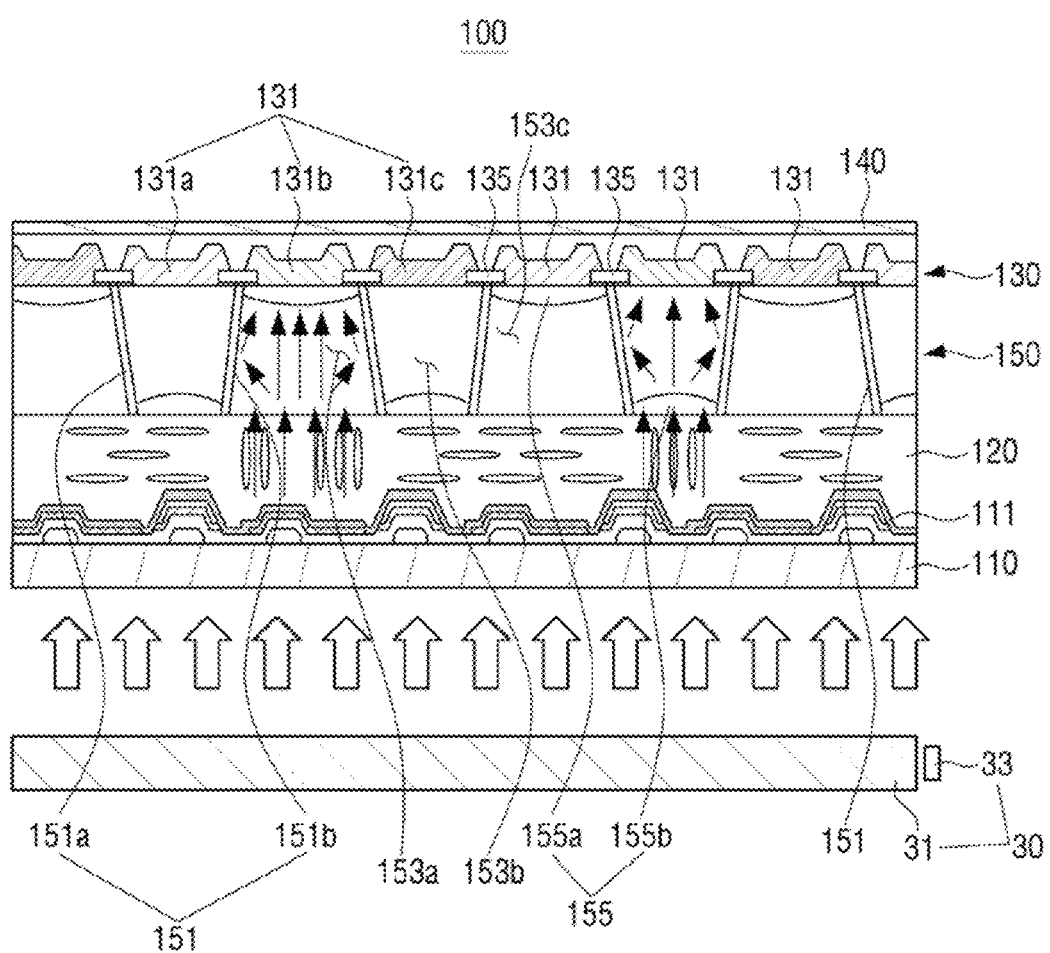
FIG. 3 is a cross-sectional view illustrating a path of light in a display panel according to an embodiment of the disclosure.

FIG. 3 is a cross-sectional view illustrating a path of light in a display panel according to an embodiment of the disclosure.

Referring to FIG. 3, the power may be applied only to the thin film transistor formed at a location corresponding with the second filter 131*b* in which a green color is realized to make a green colored light visible in the display device 10 according to an embodiment of the disclosure.

The light provided to the display panel 100 from the backlight 30 may be white color light and may be provided to the liquid crystal layer 120. When power is applied to the gate terminal of the thin film transistor which is formed at a location corresponding to the second filter 131*b* of the base substrate 110 and the thin film transistor is turned-on, an electric field may be formed, and the liquid crystal arrangement of the liquid crystal layer 120 may be changed in an area corresponding to the second filter 131*b* by the electric field, and light may pass therethrough.

The light which passed the liquid crystal layer 120 may be incident to the light collecting layer 150. The light incident to the light collecting layer 150 may proceed in all directions as light of a white color. The light which proceeds to all directions may be blocked from proceeding toward the first filter 131*a* which is adjacent to the second filter 131*b* and the third filter 131*c* by the partition wall 151. Because the light provided to the color filter layer 130 by the partition wall 151 of the light collecting layer 150 is only provided to the second filter 131*b*, the user may not view a red color and blue color light but only view purely green color light.

The phenomenon of light of different colors being mixed other than the desired color may be prevented by dividing the area corresponding to the color filter 131 to which the partition wall 151 is adjacent. The light incident to the light collecting layer 150 may be gathered toward the second filter 131*b* by the partition wall 151.

The light provided from the backlight 30 may be incident only to the vertical space 153 corresponding to the second filter 131*b* by the partition wall 151. The light incident to the vertical space 153 corresponding to the second filter 131*b* may be secondarily gathered passing through the lens 155. Accordingly, the light provided to the display panel 100 may be incident to the color filter layer 130 after converging on the light collecting layer 150.

The light collecting layer 150 may secondarily converge the light and provide the light output from the light collecting layer 150 to correspond to each of the color filters 131 of the color filter layer 130. Accordingly, the light provided by the light collecting layer 150 may realize a high color purity and color reproducibility because it does not influence the other color filters 131.

FIGS. 4A, 4B, 4C, 4D and 4E are cross-sectional views illustrating a light collecting layer according to various embodiments of the disclosure.

The light collecting layer 150 according to the various embodiments of the disclosure may be the same in most of the configurations with that of the light collecting layer 150 described in FIG. 2, but different in terms of whether the lens is disposed and whether the lens 155 is included. Accordingly, the light collecting layer 150 according to the various embodiments of the disclosure the detailed description on the identically overlapping configuration with the light collecting layer 150 described in FIG. 2 will be omitted, and the arrangement structure of the lens 155 with the difference will be mainly described.

Figure 4A:
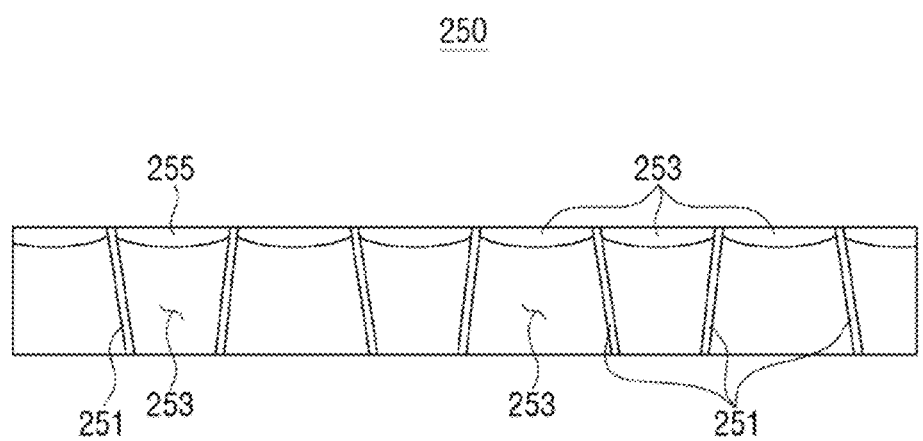
FIGS. 4A, 4B, 4C, 4D and 4E are cross-sectional views illustrating a light collecting layer according to various embodiments of the disclosure.

Referring to FIG. 4A, the light collecting layer 250 according to another embodiment of the disclosure may be the same in most of the configurations with that of the light collecting layer 150 described in FIG. 2, but different in terms of the lens 255 being disposed at the upper end of the vertical space 253.

The lens 255 may be disposed in-between the partition walls 251 which are adjacent to each other of the light collecting layer 250. The lens 255 may be disposed at the upper end of the light collecting layer 250.

The lens 255 disposed at the upper end of the light collecting layer 250 may be a concave lens having at least one or more curvature.

The light vertically incident to the vertical space 253 to which the lens 255 is disposed may be converged toward the color filter 131 by the partition wall 251, and the converged light may be converged by the lens 255 and converted gain as vertical light and provided to the color filter 131.

Figure 4B:
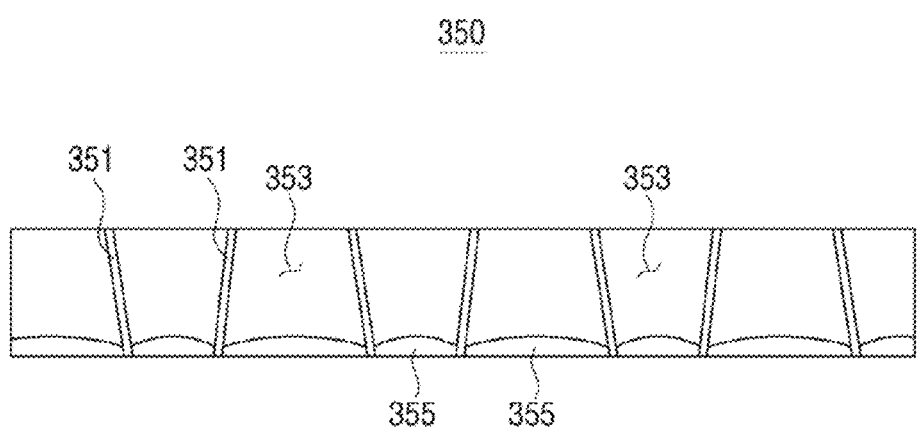

Referring to FIG. 4B, the light collecting layer 350 according to another embodiment of the disclosure may be the same in most of the configurations with that of the light collecting layer 150 described in FIG. 2, but different in terms of the lens 355 being disposed at the lower end of the vertical space 353.

The lens 355 may be disposed in-between the partition walls 351 adjacent to one another of the light collecting layer 350. The lens 355 may be disposed at the lower end of the light collecting layer 350.

The lens 355 disposed at the lower end of the light collecting layer 350 may be a convex lens having at least one or more curvature.

The light vertically incident to the vertical space 353 to which the lens 355 is disposed the light vertically incident to the light collecting layer 350 may be converged toward the color filter 131 by the lens 355, and the converged light may be converged by the partition wall 351 and provided to the color filter 131.

Figure 4C:
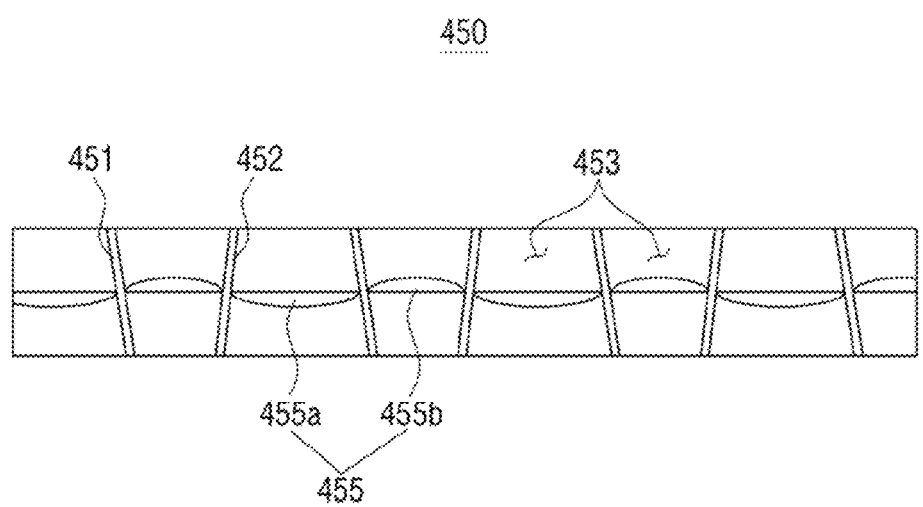

Referring to FIG. 4C, the light collecting layer 450 according to another embodiment of the disclosure may be the same in most of the configurations with that of the light collecting layer 150 described in FIG. 2, but different in terms of the lens 455 being disposed at the center of the vertical space 453.

The lens 455 may be disposed in-between the partition walls 451 adjacent to one another of the light collecting layer 450. The lens 455 may be disposed at the center of the light collecting layer 450.

The lens 455 disposed at the center of the light collecting layer 450 may be a convex lens having at least one or more curvature, or a concave lens having at least one or more curvature. In addition, the lens 455 may include a first lens 455a comprised of the concave lens and a second lens 455b comprised of the convex lens, and the first lens 455 a and the second lens 455 b may be alternately disposed.

The lens 455 may provide light which passes through the light collecting layer 450 and provide to the each of the color filters 131. The light incident to the light collecting layer 450 may be primarily converged by the partition wall 451, and secondarily converged by the lens 455.

Figure 4D:
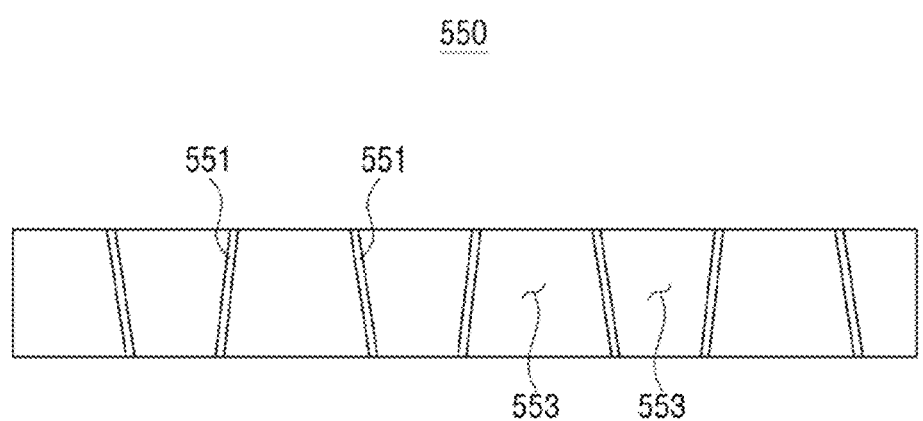

Referring to FIG. 4D, the light collecting layer 550 according to another embodiment of the disclosure may be the same in most of the configurations with that of the light collecting layer 150 described in FIG. 2, but different in terms of not including the plurality of lens disposed in-between the partition walls.

The light collecting layer 550 may include the plurality of partition walls 551 to distinguish light incident to each of the plurality of color filters 131. The plurality of partition walls 551 may be extendingly formed toward the black matrices 135 to distinguish an area of the adjacent color filter 131.

The vertical space 553 may be formed in-between the partition walls 551 adjacent with one another. The light which passes the vertical space 553 may be converged because the side surface is surrounded by the partition wall 551 and provided to the color filter 131 which corresponds to the vertical space 553.

Figure 4E:
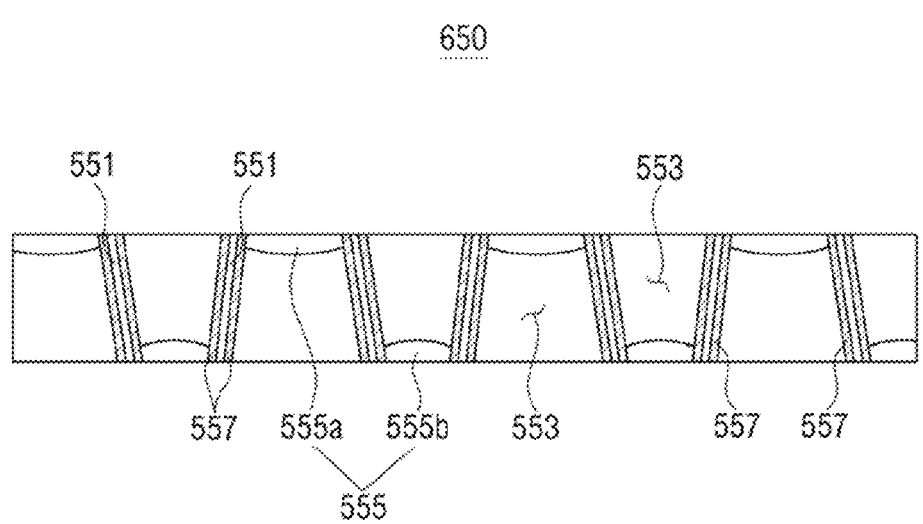

Referring to FIG. 4E, the light collecting layer 650 according to another embodiment of the disclosure may be the same in most of the configurations with that of the light collecting layer 150 described in FIG. 2, but different in terms of the partition wall 551 not including a coating layer 557.

The plurality of partition walls 551 may further include the coating layer 557. The coating layer 557 may be formed on the partition wall 551 to converge the light which passes the vertical space 553.

The coating layer 557 may be formed on at least one surface of a one surface or another surface of the partition wall 551. The coating layer 557 may increase light collecting power of the partition wall 551.

Figure 5:
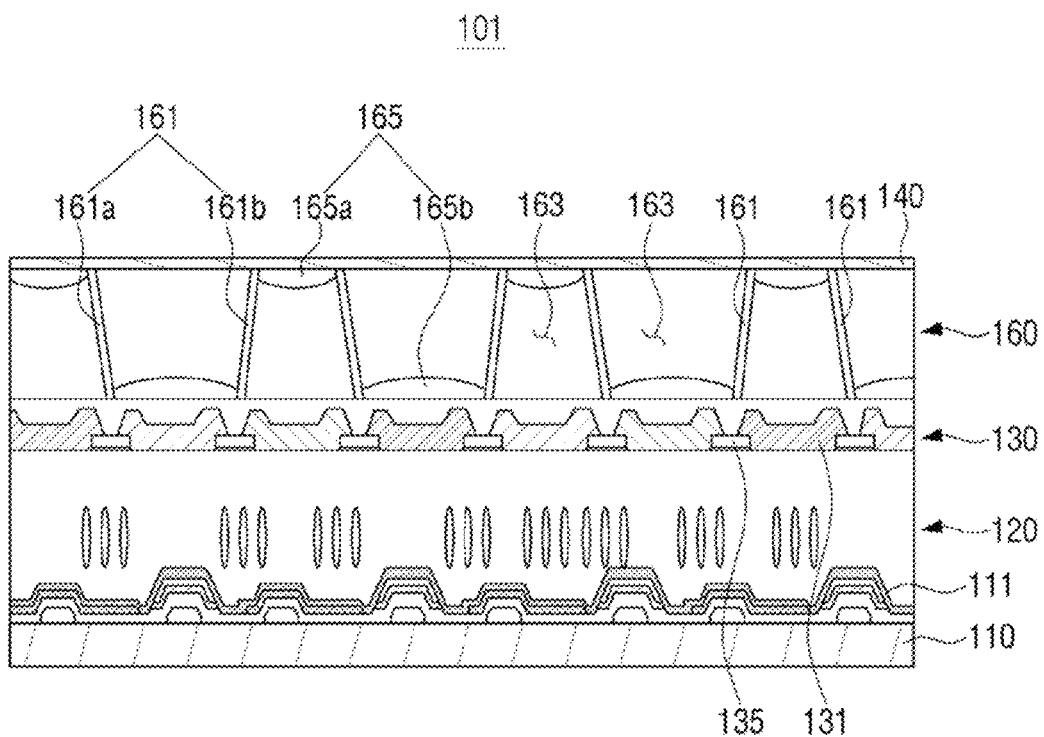
FIG. 5 is a cross-sectional view illustrating a display panel according to another embodiment of the disclosure.

FIG. 5 is a cross-sectional view illustrating a display panel according to another embodiment of the disclosure.

Referring to FIG. 5, the display panel 101 according to another embodiment of the disclosure may be the same in most of the configurations with that of the display panel 100 according to an embodiment of the disclosure described in FIG. 2, but different in terms of the light collecting layer 160 being disposed at the upper part of the color filter layer 130. Accordingly, the display panel 101 according to another embodiment of the disclosure the detailed description on the configuration identically overlapping with the display panel 100 according to an embodiment of the disclosure will be omitted, and the arrangement structure of the light collecting layer 160 may be mainly described.

The display panel 101 may include the base substrate 110, the color filter layer 130 facing the base substrate 110, the liquid crystal layer 120 disposed in-between the base substrate 110 and the color filter layer 130, and the light collecting layer 160 disposed at the upper part of the color filter layer 130.

The display panel 101 according to another embodiment of the disclosure may include the light collecting layer 160 to provide light provided from the backlight 30 to only the one color filter 131.

The light collecting layer 160 may be disposed at the upper part of the color filter layer 130. The light collecting layer 160 may be for converging the light which passed through the color filter layer 130 to the upper part direction and outputting the light.

The light collecting layer 160 may include the plurality of partition walls 161 which extends toward the black matrices 135 formed in-between the neighboring color filters 131 of the plurality of color filters 131. The partition wall 161 may be formed so as to surround the one color filter 131 in its entirety or surround a part thereof when viewed on a plane.

The partition wall 161 may gather light provided from the color filter layer 130 and output the light to only the area corresponding to the one color filter 131 of the plurality of color filters 131. The color purity realized in the each of the color filters 131 by the partition wall 161 may be improved.

The plurality of partition walls 161 may contact the upper surface of the black matrices 135 of the color filter layer 130. The partition wall 161 may be formed to have a predetermined thickness, and the thickness of the partition wall 161 may be formed to a thickness corresponding to the black matrices 135.

The partition wall 161 may be comprised of a light shielding material. The partition wall 161 may have a shape corresponding to the black matrices 135. The light provided to the one color filter 131 may be prevented from being provided to another color filter.

The plurality of partition walls 161 may be formed at an incline with respect to the color filter layer 130 to gather light provided from the color filter layer 130 and output the light. The light incident to the light collecting layer 160 may be guided so as to proceed only to the area corresponding to the one color filter 131 by the partition wall 161.

The vertical space 163 through which light passes in-between the first partition wall 161a and the second partition wall 161b which are adjacent to each other of the plurality of partition walls 161 may be defined. Each vertical space 163 may be formed by the first partition wall 161a and the second partition wall 161b.

The vertical space 163 may be formed to correspond to the upper surface of each of the plurality of color filters 131. Because the vertical space 163 is configured such that the side surface is surrounded by the partition wall 161, light which passes the vertical space 163 may only output light corresponding to each of the plurality of color filters 131.

The lens 165 may be disposed in-between the partition walls 161 adjacent to one another of the light collecting layer 160, that is the vertical space 163. The lens 165 may be disposed at a location through which light incident to the vertical space 163 may pass therethrough. The lens 165 may be disposed at the upper end, the lower end, and the center of the vertical space 163.

The lens 165 may be comprised of the first lens 165 *a* disposed at the upper end of the light collecting layer 160 and the second lens 165 *b* disposed at the lower end of the light collecting layer 160. The first lens 165 *a* and the second lens 165*b* may be alternately disposed.

In this case, the first lens 165 *a* disposed at the upper end of the light collecting layer 160 may be a concave lens having at least one or more curvature, and the second lens 165 *b* disposed at the lower end of the light collecting layer 160 may be a convex lens having at least one or more curvature.

The first lens 165 *a* and the second lens 165 *b* may be disposed to correspond to the color filter of the color filter layer 130. That is, a center of the first lens 165 *a* and the second lens 165 *b* may be disposed on an axis which is substantially the same as the center of the vertical space 163.

The light vertically incident to the vertical space to which the first lens 165 *a* is disposed may be converged with only light corresponding to the color filter 131 by the partition wall 161, and the converged light may be converged by the first lens 165 *a* and converted gain as vertical light and outputted from the display panel 101.

In addition, the light vertically incident to the vertical space to which the second lens 165 *b* is disposed the light vertically incident to the light collecting layer 160 may be converged by the second lens 165*b*, and the converged light may be converged by the partition wall 161 and output light only in an area corresponding to the color filter 131.

The lenses 165 *a* and 165 *b* may gather light which passes through the light collecting layer 160 and output the light. The light incident to the light collecting layer 160 may be primarily converged by the partition wall 161, and secondarily converged by the lens 165.

The light collecting layer 160 may diffuse making a brightness of light output from the display panel 101 uniform or converge a high-brightness light to improve light characteristics of the display device 10.

In the above, the disclosure has been described in an exemplary method. The terms used herein are to describe the disclosure and should not be understood in a limiting meaning. Various changes and modifications to the disclosure may be made according to the description above. Accordingly, unless additionally described otherwise, the disclosure may be freely implemented within the spirit and scope of the disclosure.

What is claimed is:

1. A display device, comprising:
   a display panel; and
   a backlight configured to provide light to the display panel,
   wherein the display panel comprises:
   a base substrate on which a plurality of thin film transistors are formed;
   a color filter layer disposed on the base substrate, the color filter layer comprising a plurality of color filters disposed in a matrix form and black matrices disposed in-between the plurality of color filters; and
   a light collecting layer configured to be disposed at an upper part or a lower part of the color filter layer, and comprising a plurality of partition walls,
   wherein the plurality of partition walls are comprised of a black light shielding layer and configured to have a thickness corresponding to the black matrices, and each partition wall is formed to extend toward a lower surface of a corresponding black matrix of the black matrices,
   wherein the light collecting layer further comprises a lens disposed in-between the plurality of partition walls,
   wherein the lens is alternately disposed at an upper end and a lower end of the light collecting layer,
   wherein a vertical space in the light collecting layer which is distinguished by the plurality of partition walls correspond to the plurality of color filters, and
   wherein the light provided from the back light and incident on the vertical space is collected on a color filter corresponding to each vertical space by the plurality of partition walls.

2. The display device of claim 1, wherein the lens disposed at the upper end of the light collecting layer is a concave lens, and the lens disposed at the lower end of the light collecting layer is a convex lens.

3. The display device of claim 1, wherein the lens is disposed at a center of the light collecting layer.

4. The display device of claim 1, wherein the plurality of partition walls are configured to be formed at an incline on the color filter layer.

5. The display device of claim 4, wherein the plurality of partition walls comprises:
   a first partition wall extending to a first direction; and
   a second partition wall extending to a second direction which intersect with the first direction,
   wherein the first partition wall and the second partition wall are provided to be spaced apart from each other.

6. The display device of claim 5, wherein the first partition wall and the second partition wall are alternately disposed.

7. The display device of claim 1, wherein the plurality of partition walls are spaced apart at a distance corresponding to each of the plurality of color filters.

8. The display device of claim 1, wherein the plurality of partition walls are formed to be perpendicular to the color filter layer.

9. The display device of claim 1, wherein the plurality of partition walls comprises a coating layer.

* * * * *